US008480092B2

(12) United States Patent
Hatch (10) Patent No.: US 8,480,092 B2
(45) Date of Patent: Jul. 9, 2013

(54) RADIAL SEAL AND METHOD OF MAKING

(75) Inventor: Frederick R. Hatch, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 1995 days.

(21) Appl. No.: 11/224,362

(22) Filed: Sep. 12, 2005

(65) Prior Publication Data

US 2007/0057472 A1    Mar. 15, 2007

(51) Int. Cl.
*F16J 15/32* (2006.01)

(52) U.S. Cl.
USPC .......................................................... 277/569

(58) Field of Classification Search
USPC ................................................. 277/551, 569
See application file for complete search history.

(56) References Cited

U.S. PATENT DOCUMENTS

| | | | | |
|---|---|---|---|---|
| 2,358,536 A | * | 9/1944 | Reynolds | 277/561 |
| 2,574,062 A | * | 11/1951 | Reynolds | 277/569 |
| 2,736,586 A | * | 2/1956 | Riesing | 277/573 |
| 2,781,208 A | * | 2/1957 | Foss | 277/561 |
| 3,920,250 A | * | 11/1975 | Eklund | 277/555 |
| 4,017,089 A | * | 4/1977 | Kurata et al. | 277/634 |
| 4,258,927 A | * | 3/1981 | Cather, Jr. | 277/309 |
| 4,274,641 A | | 6/1981 | Cather, Jr. | 277/153 |
| 4,436,317 A | | 3/1984 | Schmitt | 277/134 |
| 4,501,431 A | * | 2/1985 | Peisker et al. | 277/559 |
| 4,553,760 A | * | 11/1985 | Reed et al. | 277/503 |
| 4,553,763 A | * | 11/1985 | Ehrmann | 277/561 |
| 4,578,856 A | | 4/1986 | Butler | 29/451 |
| 4,588,195 A | * | 5/1986 | Antonini et al. | 277/504 |
| 4,613,143 A | | 9/1986 | Butler | 277/134 |
| 4,650,196 A | | 3/1987 | Bucher et al. | |
| 4,844,484 A | * | 7/1989 | Antonini et al. | 277/561 |
| 5,183,271 A | | 2/1993 | Wada et al. | 277/152 |
| 5,269,539 A | * | 12/1993 | Martin | 277/569 |
| 5,577,741 A | | 11/1996 | Sink | 277/153 |

(Continued)

FOREIGN PATENT DOCUMENTS

| | | |
|---|---|---|
| DE | 35 24 461 | 1/1987 |
| JP | 55082671 | 6/1980 |

(Continued)

*Primary Examiner* — Vishal Patel
(74) *Attorney, Agent, or Firm* — Robert L. Stearns; Dickinson Wright, PLLC (57) ABSTRACT

A dynamic radial seal includes a rigid casing. The seal also includes an elastomeric casing positioned interior of and bonded to the rigid casing. The elastomeric casing has an axial spring member which extends radially inwardly from and axially along the rigid casing. The axial spring member includes a neck portion which extends from the elastomeric casing and a seal attachment portion that is attached to the neck portion and has a bonding surface. The seal also includes a pre-stressed fluoropolymer seal which has a bonding surface and a sealing surface. A bond joins the bonding surface of the pre-stressed fluoropolymer seal to the bonding surface of the seal attachment portion. The seal attachment portion of the spring member is operative to provide sealing contact of the fluoropolymer seal along the entirety of its sealing surface when engaged with a mating surface of a shaft. The fluoropolymer seal may be formed from PTFE and may include a groove or grooves formed in the sealing surface to enhance the sealing performance of the seal. The elastomeric casing may also incorporate a static seal or temporary dynamic seal to facilitate in-process testing or dirt exclusion, as well as one or more additional dirt exclusion features to protect the fluoropolymer seal from damage caused by environmental contaminants during the use of the seal.

24 Claims, 10 Drawing Sheets

U.S. PATENT DOCUMENTS

| | | | |
|---|---|---|---|
| 6,102,409 A | 8/2000 | Furuyama et al. | 277/562 |
| 6,428,013 B1 | 8/2002 | Johnston et al. | 277/400 |
| 6,620,361 B1 | 9/2003 | Longtin et al. | 264/138 |
| 7,100,924 B2 * | 9/2006 | Toth et al. | 277/558 |
| 2002/0158421 A1 | 10/2002 | Johnston | 277/549 |
| 2004/0160016 A1 | 8/2004 | Hatch | 277/551 |

FOREIGN PATENT DOCUMENTS

| | | |
|---|---|---|
| JP | 60227064 A | 11/1985 |
| JP | 62013871 A | 1/1987 |
| JP | 242279 | 2/1990 |
| JP | 04300468 | 10/1992 |
| JP | 7301340 | 11/1995 |
| JP | 9273632 | 10/1997 |
| JP | 2003035371 A | 2/2003 |
| JP | 2003035373 A | 2/2003 |
| JP | 2006518027 | 8/2006 |
| WO | WO8001307 A1 | 6/1980 |
| WO | 2004005002 A | 1/2004 |

* cited by examiner

RADIAL SEAL AND METHOD OF MAKING

BACKGROUND OF THE INVENTION

1. Technical Field

This invention relates generally to radial seals. More particularly, the invention relates to an improved fluoropolymer radial seal, such as a radial shaft seal, that is bonded directly to an elastomeric casing layer.

2. Related Art

Radial shaft seals that are designed for use in sealing the main rotating shaft of vehicle air conditioner compressors, superchargers, power steering pumps, and engine crankshafts may utilize multiple sealing elements designed such that a first sealing element facing the fluid or gas to be sealed is an elastomer, such as a natural or synthetic rubber. The elastomer generally has sufficient flexibility and resilience to provide a seal against the shaft. A second stiffer, lower friction, and more chemically resistant sealing element is generally positioned behind and in tandem with the elastomeric seal such that an axial gap is provided between the sealing edge of the stiffer wear-resistant seal and the back sealing edge of the more resilient elastomeric sealing element. The second sealing element is generally made from a fluoropolymer, such as polytetrafluoroethylene (PTFE), or a filled PTFE material which incorporates one or more known filler materials to control the mechanical, tribological or other properties of the PTFE.

Generally in the art, the elements of such seal structures have been typically assembled together and then are clamped together in a unit using a crimping process. In such a process, a rubber element and the PTFE component are crimped between two rigid casings to form a seal. The PTFE component is also typically crimped between the rubber element and one of the rigid casings. It is known in the art to utilize a flat PTFE washer or preformed conical-shaped structure that is bonded or clamped to form the overall seal.

Other radial shaft seal designs have also been proposed which do not utilize crimping or clamping of the elastomer and PTFE component into a rigid casing, but rather utilize a metal casing to which the PTFE sealing element is attached by molding an elastomeric member to both the PTFE sealing element and the metal casing. In such designs, the PTFE element may be used only as a bearing member to support and control the load of the elastomeric sealing element, such that the sealing function is entirely performed by the elastomeric sealing element. An example of such a seal configuration is shown in U.S. Pat. No. 4,274,641 to Cather. In this configuration the PTFE bearing member and the elastomeric sealing lip are bonded in tandem and are both in contact with the shaft surface. Similarly, in U.S. Pat. No. 6,428,013 to Johnston et al. several seal designs are disclosed where both the PTFE sealing element and elastomeric element are in contact with the shaft surface on which sealing is to be affected.

Still other seal designs have also been proposed which do not incorporate an elastomeric sealing element and which rely entirely on a PTFE sealing element to provide the fluid seal. One such radial shaft seal design is described in U.S. Pat. No. 4,650,196 to Bucher et al. In Bucher et al., the PTFE element is bonded over a portion of its length to an elastomeric casing which is in turn bonded to a rigid casing. Similarly, in Johnston et al. several seal designs which incorporate a PTFE sealing element as the primary sealing element are disclosed.

One limitation of the related art radial shaft designs, such as those described above, is that the PTFE sealing element does not seal along its entire length. For example, in the designs of Johnston et al. the PTFE sealing element is not in contact with the shaft along its entire length. This is also the case for the PTFE member of Bucher et al. leading to a sub-optimal use of the available PTFE sealing material. Furthermore, these radial seal designs also provide limited control of the sealing pressure applied either by the PTFE sealing element itself to the shaft or other sealing surface, or else by the combination of the elastomeric casing and the PTFE sealing element to the shaft or other sealing surface because of the limited contact area of the PTFE. In addition to the limitations noted above, related art radial shaft seal designs also have known limitations with respect to installation of the seals onto the shaft or other member to be sealed. Many of the known designs where the PTFE lip is the primary sealing lip have the free end of the radial sealing lip facing the fluid side, usually the oil side, of the sealed region. These configurations are known to be difficult to install onto circular shafts and the like, necessitating the use of special fixtures and installation tools, and special assembly precautions or methods to assemble such seals on shafts so as to avoid nicking or otherwise damaging the surface of the PTFE material, and thus destroying the functionality of the seals. Fluoropolymer sealing materials, such as PTFE, are known to be very susceptible to nicking or other surface damage to the sealing surface which can compromise their ability to seal effectively. Reverse lay down configurations of the PTFE sealing element, where the free end of the sealing element faces away from the oil side of the installation, have been proposed, such as in Johnston et al., in order to enhance the ability to install such seals and lessen the susceptibility to nicking, inverse folding, or creasing during installation. However, such seal configurations are still believed to be subject to other limitations, such as those described above.

Therefore, it is desirable to develop radial shaft seals having PTFE sealing elements which overcome the limitations of related art seal designs.

SUMMARY OF THE INVENTION

The present invention is a radial seal, such as a radial shaft seal, having a fluoropolymer sealing element which is bonded to an elastomeric casing which is in turn bonded to a rigid casing, such as a rigid metal casing. Radial seals of the present invention may also incorporate additional features molded into the elastomeric casing such as dirt exclusion lips and static air seals which may further enhance installation, testing (i.e., air leak testing) or operation of the seals.

In one aspect, the present invention is a radial seal which includes a rigid casing. The seal also includes an elastomeric casing positioned interior of and bonded to the rigid casing. The elastomeric casing has an axial spring member which extends radially inwardly from and axially along the rigid casing. The axial spring member includes a neck portion which extends from the elastomeric casing and a seal attachment portion that is attached to the neck portion and has a bonding surface. The seal also includes a pre-stressed fluoropolymer seal which has a bonding surface and a sealing surface. A bond joins the bonding surface of the pre-stressed fluoropolymer seal to the bonding surface of the seal attachment portion. The seal attachment portion of the spring member is operative to provide sealing contact of the fluoropolymer seal along the entirety of its sealing surface when engaged with a mating surface of a shaft.

In a second aspect of the invention, the neck portion may have any one of a number of shapes or profiles, including a generally linear profile, curvilinear profile, bellows profile, or any one of a number of other known shapes or profiles. This provides the advantage of being able to tailor the spring and other characteristics of the axial spring member (i.e., force, flexibility and followability), including the neck and the attachment portions of the elastomeric casing.

In a third aspect of the invention, the thickness of the attachment portion of the axial spring member may be generally constant axially and radially in order to apply a generally uniform sealing pressure to the fluoropolymer seal element, or may be variable axially in order to provide a variable sealing pressure along the axial length of the fluoropolymer seal element.

In a fourth aspect of the invention, the fluoropolymer sealing element may optionally incorporate various sealing features in the bonding surface of the fluoropolymer element, including, threaded or other continuous groove patterns, or patterns of one or more circumferential grooves or channels or other discontinuous groove patterns, or combinations of the above. These groove patterns may have a uniform depth or variable depth along the length of the fluoropolymer element. The grooves may also alternately constitute raised ribs. These grooves provide the advantage of enhancing the retention of the fluid, such as oil, which is to be sealed by the action of the radial seal, such as by providing a hydrodynamic pumping action of the fluid in conjunction with the rotation of the sealing surface.

In a fifth aspect of the invention, the radial seal may optionally include an air lip or seal into the elastomeric casing on the air side of the radial seal. This seal is preferably a static seal, but may also be used in the context of a transient or temporary dynamic seal for a limited duration, such as initial or in-process testing during the manufacture and/or use of the device which incorporates the radial seal. In the context of an internal combustion engine, this provides the advantage of in-process pressure testing of the engine during the engine manufacturing and assembly process, and facilitate acceptance or rejection of the engine, without the need to also provide temporary or in-process seals on the shaft surface to be sealed by the radial seal in order to facilitate this testing.

In a sixth aspect of this invention, the radial seal may optionally incorporate one or more integral dirt exclusion lips into the elastomeric casing on the air side of the seal in order to advantageously promote exclusion of dirt and other contaminants from the fluoropolymer sealing element during use of the device in which it is installed.

In a seventh aspect of the invention, the pre-stressed fluoropolymer element will generally have a stress profile that varies in magnitude longitudinally along the length of the fluoropolymer element. Advantageously, this stress profile may be tailored by controlling the thickness and/or thickness profile of the element, along with the amount of pre-stressing the PTFE element is subjected to after stretching the element into its final location in the mold. Further, the method of stretching the fluoropolymer element allows the element to be oriented with the stress profile in one of two orientations, one being the inverse of the other, based on how the stretched seal is loaded into a mold with the other elements of the radial seal.

In an eighth aspect of the invention, the radial seal of the present invention may be configured in either a standard or a reverse lay-down configuration. In either configuration, the radial seal of the present invention is believed to be less susceptible to potential seal damage issues associated with installation of the seals on a shaft or other surface to be sealed. In fact, the configuration of the radial seal of the present invention reduces the distinction between the traditional installation configuration and a reverse lay-down installation configuration seals by virtue of the fact that it has fundamentally two free ends and thus, it has less of a distinction with regard to whether the seal is installed first from the free end than related art seal designs. It presents more of a bi-directional lay-down configuration. Further, this feature can be combined with the ability to orient the pre-stress level in the fluoropolymer element such that the highest level of pre-stress and thus the greatest sealing force is applied to the surface to be sealed either closer to or farther from the installation end of the seal. For example, the fluoropolymer element may be located in the seal with the pre-stress level profile oriented such that the sealing force applied to the sealing surfaces is lower closer to the installation end in order to promote the installation of the seal.

In a ninth aspect of the invention, a new method for making radial shaft seal, includes the steps of: stretching a fluoropolymer seal preform having an inner diameter and an outer diameter at least about the inner diameter utilizing a mandrel device to form a pre-stressed fluoropolymer seal having an inner diameter and an outer diameter; locating the pre-stressed fluoropolymer seal having a bonding surface and a sealing surface in a mold having a mold cavity, wherein the bonding surface is exposed to the mold cavity; locating a rigid casing within the mold cavity proximate the pre-stressed fluoropolymer seal; and introducing an elastomeric material into the mold cavity to mold an elastomeric casing which is positioned interior of and bonded to said rigid casing and has an axial spring member which extends radially inwardly from and axially along the rigid casing, the axial spring member comprising a neck portion which extends from the elastomeric casing and a seal attachment portion that is attached to the neck portion and has a bonding surface, and which has a bond joining the bonding surface of the pre-stressed fluoropolymer seal to the bonding surface of the seal attachment portion, wherein the seal attachment portion is operative to provide sealing contact of the fluoropolymer seal along the entirety of the sealing surface when engaged with a mating surface of a shaft.

BRIEF DESCRIPTION OF THE DRAWINGS

These and other features and advantages of the present invention will become more readily appreciated when considered in connection with the following detailed description and appended drawings, wherein like elements have like designations, and wherein.

DETAILED DESCRIPTION OF THE PREFERRED EMBODIMENTS

The present invention is a radial shaft seal for sealing against passage of a fluid with respect to a rotating radial shaft. The radial shaft seal has as a primary sealing member a pre-stressed fluoropolymer seal which is bonded to an elastomeric casing which is in turn bonded to a rigid casing. In use, the pre-stressed fluoropolymer seal is in fluid tight sealing contact with a sealing surface on a radial shaft. The radial shaft seal is suitable for many radial rotating shaft sealing applications for sealing against passage of a fluid, particularly a number of automotive applications, including a crankshaft seal. Although not illustrated, it will also be understood that the invention applies equally to seals with unitizing wear sleeve elements, wherein the wear sleeve element is located on a circular shaft.

FIGS. 1-6 show various embodiments of a radial shaft seal 10, according to the invention as molded and trimmed, that is, as the seal 10 is formed in an appropriate apparatus, such as in an injection molding press, removed from the molding press and trimmed to provide a finished or partially finished seal. The seals 10 may be made by any of a number of known methods, including compression, transfer, or injection molding, or a combination of these processes, or similar processes for bonding a pre-stressed fluoropolymer seal to a rigid carrier using an intermediate elastomeric member or casing to form seals 10.

Figure 1:
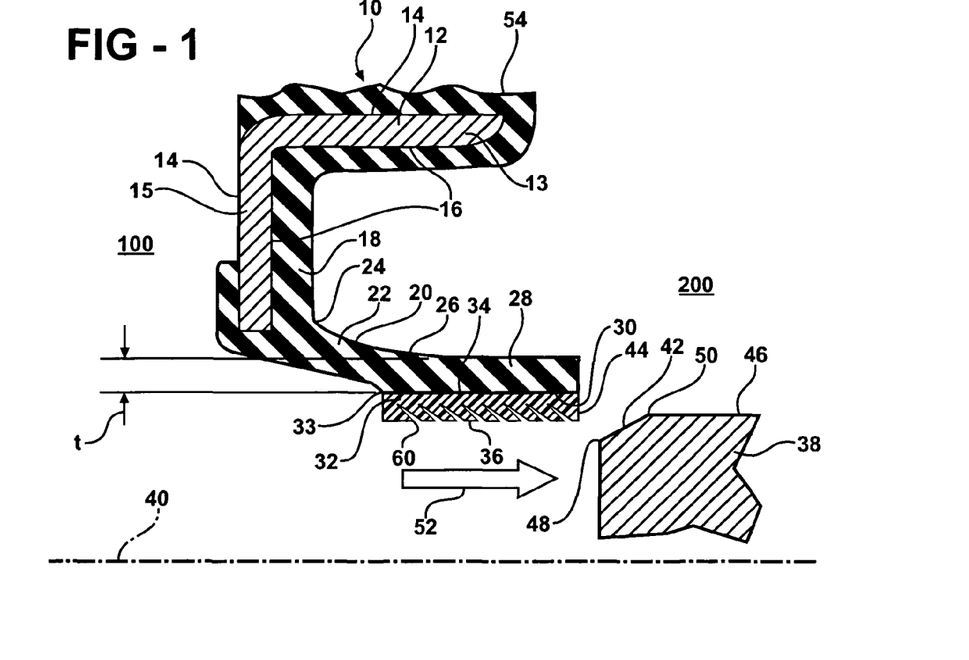
FIG. 1 is a sectional view of a first embodiment of the radial shaft seal of the present invention.
Figure 2:
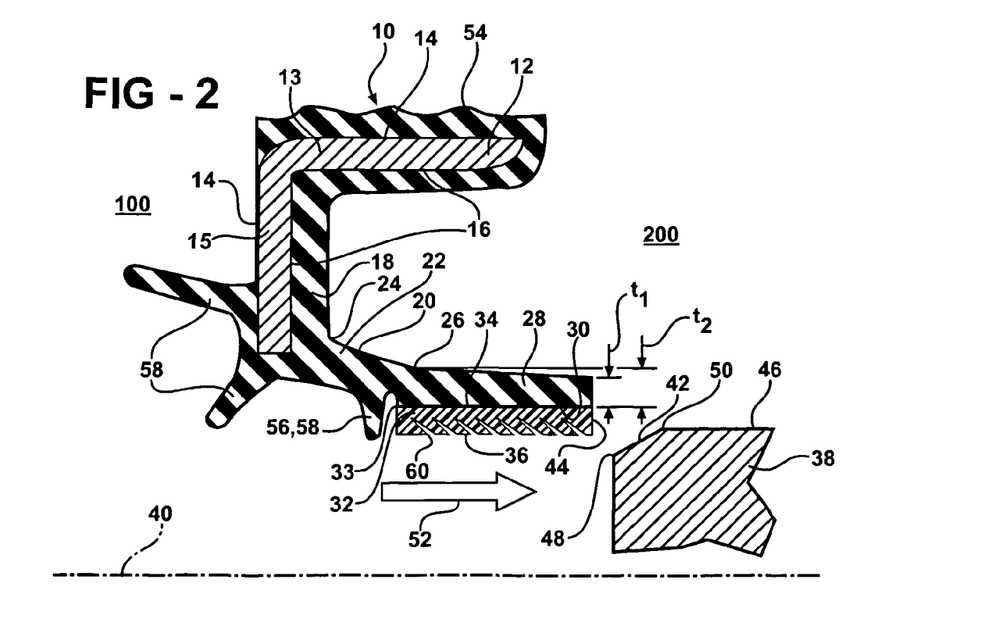
FIG. 2 is a sectional view of a second embodiment of the radial shaft seal of the present invention.
Figure 3:
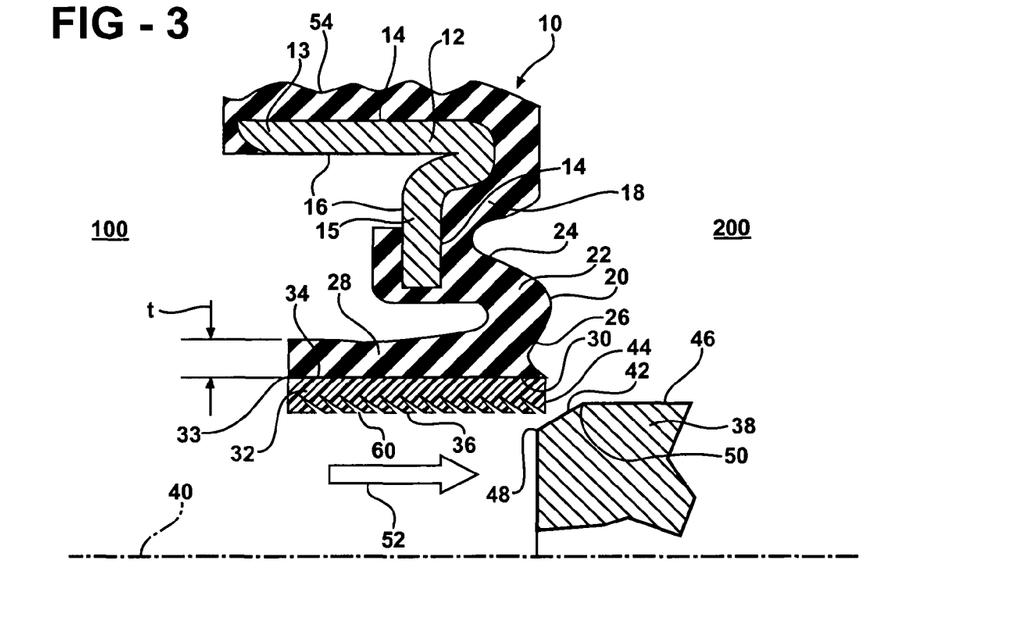
FIG. 3 is a sectional view of a third embodiment of the radial shaft seal of the present invention.
Figure 4:
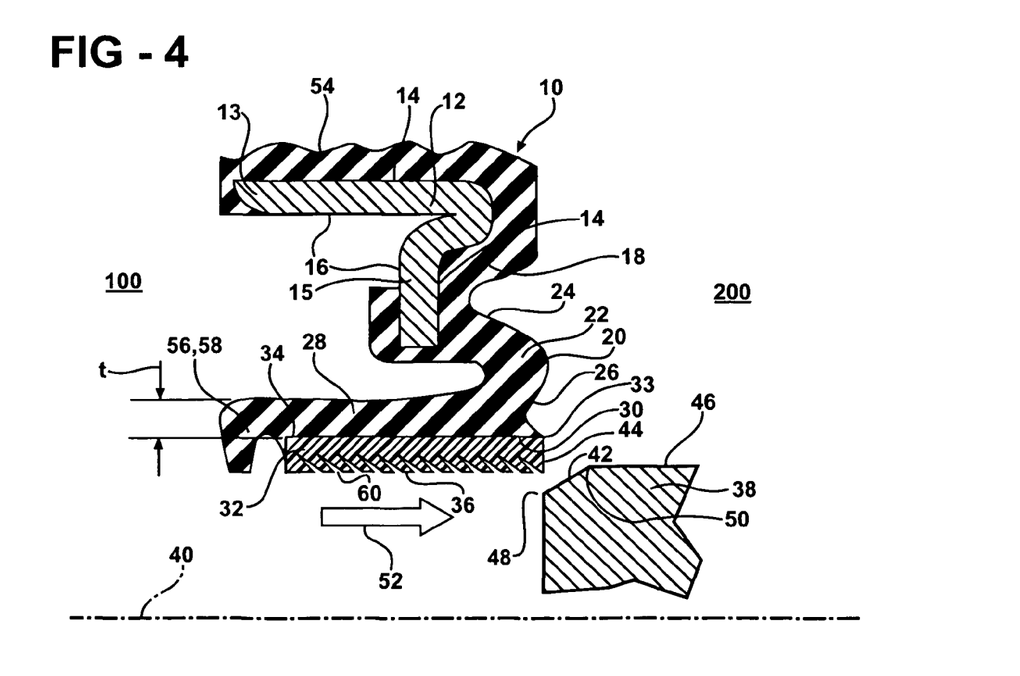
FIG. 4 is a sectional view of a fourth embodiment of the radial shaft seal of the present invention.
Figure 5:
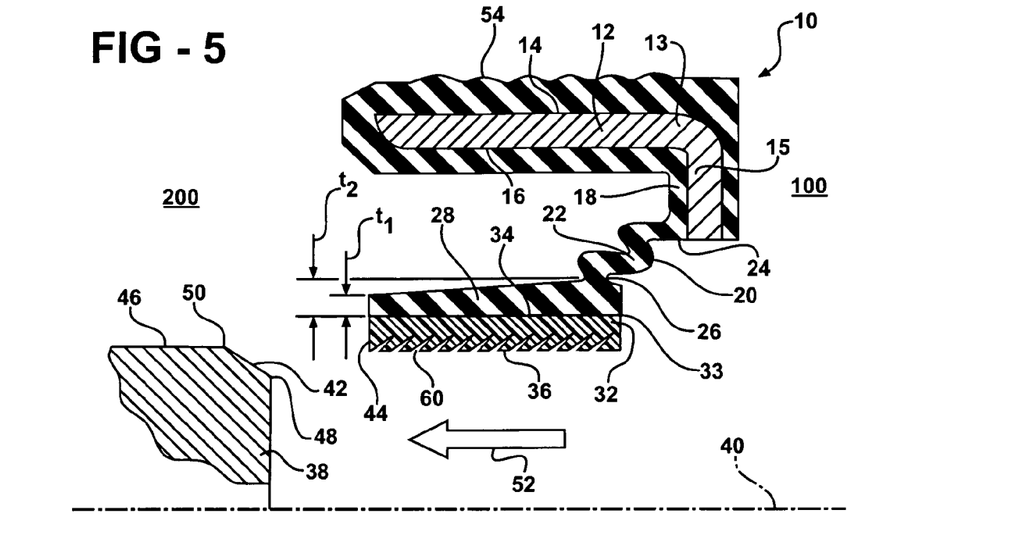
FIG. 5 is a sectional view of a fifth embodiment of the radial shaft seal of the present invention.
Figure 6:
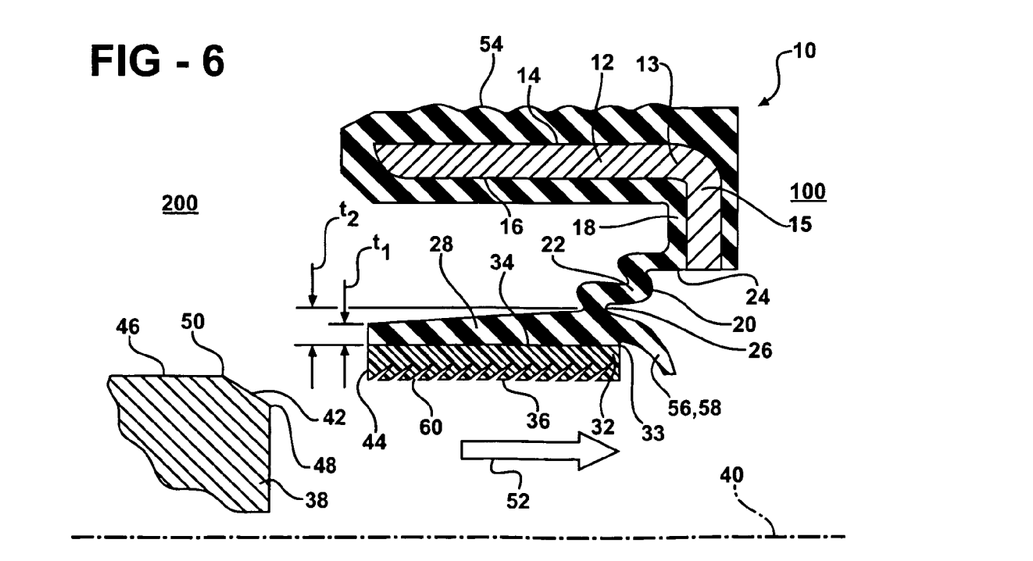
FIG. 6 is a sectional view of a sixth embodiment of the radial shaft seal of the present invention.

In FIGS. 1-6, radial shaft seal 10 includes a rigid casing 12 having an exterior surface 14, and an interior surface 16. Seal 10 also includes elastomeric casing 18 which is positioned to a rigid casing, preferably at least partially within interior surface 16 and which is bonded to the rigid casing 12, preferably at least partially to interior surface 16. Elastomeric casing 18 may also be partially positioned on and bonded to exterior surface 14. Elastomeric casing 18 also may be utilized to provide a static seal for a fluid to be sealed with respect to the device housing the shaft for which the fluoropolymer seal element serves as a dynamic sealing element, as further described herein. Elastomeric casing 18 has an axial spring member 20 which extends radially inwardly and axially from rigid casing 12, generally radially inwardly away from and axially along interior surface 16 of the rigid casing 12. However, depending on the shape of rigid casing 12 and the orientation and shape of axial spring member 20, axial spring member 20 may also extend a radially away from and axially along exterior surface 14, such as, for example, where rigid casing 12 has an radially inwardly curving J-shape. Axial spring member 20 has a neck portion 22 which extends from elastomeric casing 18 on one end 24 and on an opposite end 26 to a seal attachment portion 28 having a bonding surface 30. Seal attachment portion 28 generally includes the remainder of axial spring member 20 other than neck portion 22. Seal 10 also includes a pre-stressed, lubricious, low coefficient of friction fluoropolymer seal 32 having an outer or bonding surface 34 and an inner or sealing surface 36. Axial spring member 20 extends axially along the longitudinal axis 40 of radial seal 10 and generally exerts a spring force which tends to urge the spring member 20 and the fluoropolymer seal against the surface which is to be sealed. The radial neck portion 22 may have any of a number of neck shapes and section profiles such as a generally linear or curvilinear profile (FIGS. 1 and 2) forming a frustoconical-shaped radial element, a convoluted profile (FIGS. 3 and 4) forming a convoluted frustoconical-shaped radial element, an undulating or wavy profile (FIGS. 4 and 5) forming a converging bellows-shaped radial element and many other neck shapes and section profiles. The neck portion 22 permits radial seal 10 to accommodate minor misalignment with respect to the longitudinal axis of the seal and the longitudinal axis of the shaft, or for dynamic eccentricities or runout of the shaft when the shaft is rotating. This is a significant advantage of the present invention over prior art seal designs. On the opposite end 26 of neck portion 22, axial spring member 20, also includes an attached axially extending attachment portion 28. Attachment portion 28 extends along the entirety of the length of fluoropolymer seal 32. In FIGS. 3 and 4, the section thickness (t) of attachment portion 28 is shown as being generally constant along its length, except where it joins neck portion 22. This permits attachment portion 28 to provide a generally uniform sealing pressure to fluoropolymer seal 32 when the radial seal is installed on a shaft. It is preferred that the thickness of the seal attachment portion 28 be more than one half the thickness of the pre-stressed fluoropolymer seal 32. It is believed that a thickness range of about 0.010-0.060 inches is suitable for attachment portion 28 for many applications of radial seal 10. However, the thickness of attachment portion 28 may also be varied along its length, as shown in FIGS. 2, 5 and 6 with the result that the sealing pressure which it provides as part of spring member 20 similarly varies along its length according to the profile thickness. The thickness may be varied according to any suitable profile. In FIGS. 2, 5 and 6, the profile thickness varies linearly from a maximum thickness t2 to a minimum thickness t1. The thickness profile may vary linearly as shown, or may have an involute, convolute or other curvilinear profile. The section thickness profile will of course alter the spring characteristics of spring member 20, and the spring compressive force which results as seal 10 and pre-stressed fluoropolymer seal 32 is installed over shaft 38 in an interference condition, as further described herein.

Pre-stressed fluoropolymer seal 32 is preferably formed from polytetrafluoroethylene (PTFE). As is well known in the art, the fluoropolymer, such as PTFE, used for fluoropolymer seal 32 may also incorporate any of a number of fillers or other materials used to modify the mechanical, tribological or other properties of the fluoropolymer. The pre-stressed condition of fluoropolymer seal 32 is produced by stretching a fluoropolymer preform 72 (See FIG. 8), preferably a PTFE washer or hollow disk, sufficiently to produce plastic deformation of the preform 72 and resultant levels of residual internal stress as pre-stress in fluoropolymer seal 32. The magnitude of the pre-stress and the pre-stress profile along the length of the seal may be affected and varied as further described herein. Seal 10 also includes a bond interface 33 joining the outer or bonding surface 34 of the pre-stressed, low coefficient of friction fluoropolymer seal 32 to bonding surface 30 of seal attachment portion 28. The seal attachment portion 28 is operative to provide sealing contact of the pre-stressed, lubricious, low coefficient of friction fluoropolymer seal 32, such as a pre-stressed polytetrafluoroethylene seal, along the entirety of sealing surface 36 when engaged with a mating shaft 38 or other surface against which a seal is to be affected. The fluoropolymer seal 32 may incorporate a groove 60 into sealing surface 36, such as a continuous spiral, helical or threaded groove, with the groove preferably being inclined toward the fluid or oil side of the seal. Such grooves or groove patterns are well-known and provide a hydrodynamic pumping action in response to the relative rotation of the radial seal 10 and the sealing surface. The depth of the groove 60 (or a plurality of grooves 60) may be constant along its length, or may vary in depth from one end of fluoropolymer seal to the other. A continuous groove 60 may also include either separately or together with the continuous groove one or more discontinuous circumferential grooves or channels (not shown) that are well-known and used to stop or accumulate the fluid to be sealed during the operation of the radial seal 10. Groove 60, whether continuous, discontinuous or a combination thereof, may be formed using well known forming methods such as coining or machining. Grooves 60 may alternately constitute raised ribs formed on sealing surface 36. The fluoropolymer seal 32 is preferably chemically bonded at bond interface 33 to the bonding surface 30 of attachment portion 28 of elastomeric casing 18 by conventional means, such as by bonding affected by injection molding of the elastomer directly onto the outer surface of the pre-stressed fluoropolymer seal 32. The methods used to mold the elastomeric casing and affect the chemical bonding of the fluoropolymer seal 32 and the attachment portion 28 are well-known.

Rigid casing 12, elastomer casing 18 and pre-stressed fluoropolymer seal 32 as well as the other elements of radial seal 10 are radially oriented about the longitudinal axis 40 of seal 10. It is desired that when radial seal 10 is installed on a shaft 38, that the longitudinal axis 40 of radial seal 10 also coincide with the longitudinal axis of the shaft 38. However, due to manufacturing tolerance allowances, small amounts of misalignment, either axis offset, non-parallelism or combinations of each are known to occur. Therefore, it is desired that radial seal 10 be selected and dimensioned with regard to shaft 38 such that there exists, between shaft sealing surface 46 of shaft 38 and sealing surface 36 of pre-stressed fluoropolymer seal 32, an interference fit along the entire length of sealing surface 36. In order to accomplish this, shaft 38 will typically incorporate a chamfer 42 or bevel or similar lead-in edge 48 on a free or installation end to promote the engagement and installation of radial seal 10 onto shaft 38. The graduated radius of the chamfer 42 will generally be selected such that the lead-in edge 48 and a portion of chamfer 42 of the free or installation end of the shaft 38 does not present an interference with the radius of installation end 44 of radial seal 10, while the radius at the opposite end 50 of chamfer 42 presents the interference described above with respect to shaft 38 and radial seal 10. The interference is generally designed to occur somewhere along the length of chamfer 44. The degree of interference is selected such that fluoropolymer seal 32 applies the desired sealing pressure at sealing surface 36 to sealing surface 46 of shaft 38, as is well known in the art of seal design for seals which incorporate fluoropolymer seal elements, such as PTFE. As illustrated in FIGS. 1-6, radial seal 10 is installed onto shaft 38 by movement of radial seal 10 in the direction of arrow 52, or conversely by movement of shaft 38 in an opposite direction, such that the entirety of bonding surface 36 is in sealing contact with sealing surface 46. This full contact of the entirety of sealing surface 36 of fluoropolymer sealing element 32 along the sealing surface 46 of the shaft 38 is an important feature of the invention and represents a significant and advantageous improvement over related art seal designs. The embodiment of the invention illustrated in FIG. 1 represents a traditional radial seal 10 orientation, in that the free end of the seal and installation end 44 are oriented away from the air side 100 of the seal and closest to the oil side, or more generally, the fluid side 200 of the seal. When the radial seal 10 is assembled to the shaft 38, the region shown as 200 is the enclosed or sealed region and is referred to as the oil side, whiles the region shown as 100, lies outside the sealed region and is referred to as the air side.

The rigid casing 12 may be in any suitable shape, several of which are illustrated in FIGS. 1-6, depending on the overall application requirements for radial seal 10 and the desired configuration of the other seal elements. Rigid casing 12 may be from any suitable rigid structural material. Rigid casing 12 is preferably a metal casing, and may be formed from any suitable metal, such as steel. Rigid casing 12 may also be formed from a suitably rigid engineering plastic, or plastic composite. Rigid case 12 generally has an axial case portion 13 and a radial case portion 15. The elastomeric casing may be bonded to either or both of the axial casing portion 13 and the radial casing portion 15.

Figure 13:
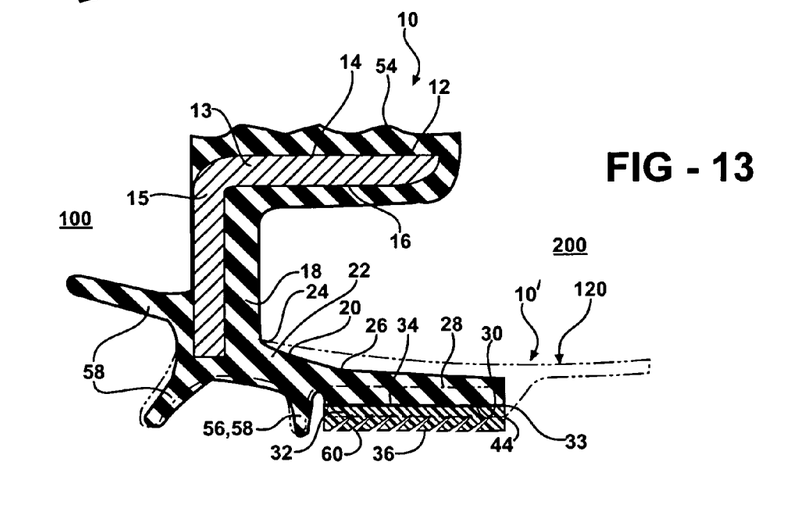
FIG. 13 is a sectional view of a molded seal of the present invention both prior to (in phantom) and after trimming of the molded seal.

The elastomeric casing 18 may be virtually any elastomer, including thermoset polymer elastomers such as fluoroelastomers, polyacrylate, nitrile, hydrogenated nitrile or silicone or similar thermoset elastomers, or a suitable thermoplastic elastomer. The elastomeric material of elastomeric casing 18 will generally be selected with regard to the application requirements, such as the temperature of operation of the seal, chemical resistance or compatibility with respect to the fluid to be sealed, bonding and other compatibility with the material of the rigid casing 18 and the fluoropolymer seal element 32, and other factors. The elastomeric casing 18 is bonded and attached to at least one of the exterior surface 14 or interior surface 16 of the casing, and may be bonded to both depending on the design of the seal. The location of elastomeric casing 18 on rigid casing 12 will also be determined with respect to the static sealing requirements associated with elastomeric casing 18, as described above and as generally well-known in the art. In FIGS. 1-6, a static sealing portion 54 of radial seal 10 is formed by bonding a portion of elastomeric casing 18 on the exterior surface 14 of rigid casing 12. Referring to FIG. 2, the elastomeric casing 18 may also optionally incorporate other features of radial seal 10, including one or more elastomeric static sealing lips 56, as well as one or more elastomeric exclusion lips 58 for excluding dirt or other contamination from the region associated with the fluoropolymer seal 32. Elastomeric sealing lip 56 is located on the air side 100 of radial seal 10 and the pre-stressed fluoropolymer seal 32, and is preferably designed and dimensioned so as to provide no sealing pressure, or minimal sealing pressure on the shaft 38, and in particular so as to not interfere with the dynamic sealing action of pre-stressed fluoropolymer seal 32. Sealing lip 56 is generally utilized as a static seal to facilitate in-process pressurization and air leak testing (i.e., from the oil side 200) during assembly of the device which incorporates radial seal 10, such as an internal combustion engine. Sealing lip 56 may also act as a temporary dynamic seal as it is in contact with the shaft, but because it is located on the air side of the seal and is not typically exposed to lubricating fluid, such as oil, it quickly is worn away by the rotation of the shaft during use of the device. The sealing lip 56 also functions as a primary dirt exclusion lip 58 that is operative to exclude dirt from external sources from the portion of the shaft 38 proximate pre-stressed seal 32. Sealing lip 56 may also be designed so as to not apply sealing pressure on the shaft except in response to pressure testing associated with the device, such as in the case where radial seal is pressurized from the air side 100. The exclusion lip 58 will be positioned and shaped so as to be operative to exclude contaminants, such as dirt, from the pre-stressed fluoropolymer seal 32. Additional exclusion lips may be incorporated as shown in FIGS. 2 and 13. The ability to incorporate sealing lip 56 and exclusion lip 58 without deleteriously affecting the dynamic sealing characteristics of the pre-stressed fluoropolymer seal 32 is another important advantage of the present invention.

FIG. 3 illustrates another embodiment of the present invention. Referring to FIG. 3, radial seal 10 is a reverse lay-down configuration in that the free end of the fluoropolymer seal 32 is closer to and facing the air side 100 of the radial seal 10, with a convoluted neck portion 22.

FIG. 4 illustrates yet another embodiment of the present invention. The radial seal of FIG. 4 is identical to that of FIG. 3, except that the radial seal 10 of FIG. 4 also includes an elastomeric sealing lip 56 to provide a static air seal on the air side 100 of the seal 10 as described above. Static seal 56 also functions as a dirt exclusion lip 58. The seal of FIG. 4 may optionally also include one or more additional exclusion lips 58 (not shown) which are attached to the free end of attachment portion 28. The sealing lip 56 and additional exclusion lip 58 may be used separately or in combination with one another.

FIG. 5 illustrates still another embodiment of the present invention. Referring to FIG. 5, radial seal 10 is a traditional lay-down configuration in that the free end of the fluoropolymer seal 32 is closer to and facing the oil side of the radial seal 10, with a bellows-shaped neck portion 22. This embodiment also illustrates a variable thickness along the length of attachment portion 28.

FIG. 6 illustrates yet another embodiment of the present invention. The radial seal of FIG. 6 is identical to that of FIG. 5, except that the radial seal 10 of FIG. 6 also includes an elastomeric sealing lip 56 to provide a static seal on the air side of the seal, as described above. Static seal 56 also functions as a dirt exclusion lip 58. This seal configuration may also incorporate one or more additional exclusion lips 58 (not shown) as described above.

Figure 7:
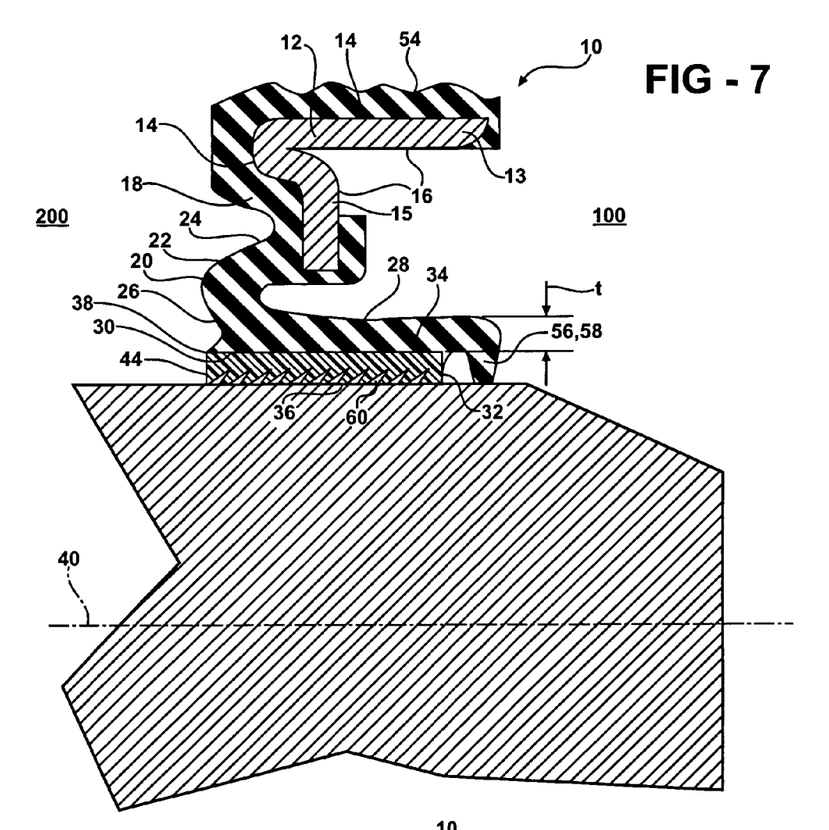
FIG. 7 is a sectional view of a radial shaft seal of the present invention in sealing contact with a radial shaft.

FIG. 7 illustrates a radial seal 10 of the present invention which has been installed onto radial shaft 38. The entire length of sealing surface 36 is in sealing contact with and is operative to seal oil on the oil side 200 from escaping to the air side 100. The spiral grooves 60 are operative to pump oil which may migrate toward the free end 44 and air side 100 back toward oil side 200 in response to relative rotation of the radial seal 10 and shaft 38.

In FIGS. 8-12, there is also disclosed as an aspect of the invention, a method 300 of making or manufacturing a radial shaft seal 10 comprising the steps of: stretching 310 a fluoropolymer seal preform 72 having an inner diameter 62 and an outer diameter 74 at least about the inner diameter 62 utilizing a mandrel device 64 to form a pre-stressed fluoropolymer seal 32 having an inner diameter and an outer diameter; locating 320 the pre-stressed fluoropolymer seal 32 having a bonding surface 34 and a sealing surface 36 in a mold 66 having a mold cavity 70, wherein the bonding surface 34 is exposed to the mold cavity 70; locating 330 a rigid casing 12 within the mold cavity 70 proximate the pre-stressed fluoropolymer seal 32; and introducing 340 an elastomeric material into the mold cavity 70 to mold an elastomeric casing 18 which is positioned interior of and bonded to said rigid casing 12 and has an axial spring member 20 which extends radially inwardly from and axially along the rigid casing 12, the axial spring member 20 comprising a neck portion 22 which extends from the elastomeric casing 18 and a seal attachment portion 28 that is attached to the neck portion 22 and has a bonding surface 30, and which has a bond 33 joining the bonding surface 34 of the pre-stressed fluoropolymer seal 32 to the bonding surface 30 of the seal attachment portion 28, wherein the seal attachment portion 28 is operative to provide sealing contact of the pre-stressed fluoropolymer seal 32 along the entirety of the sealing surface 36 when engaged with a mating surface 46 of a shaft 38. Method 300 uses a similar method of forming the pre-stressed fluoropolymer seal 32 as described in co-pending U.S. patent application Ser. No. 10/366,253 dated Feb. 13, 2003, which is hereby incorporated herein by reference in its entirety. The seals of this pending application are different from those of the present invention, in that the elastomeric element of these seals comprises a part of the dynamic radial seal, and the fluoropolymer sealing elements do not seal along the entire length of the fluoropolymer element, but the method of stretching and pre-stressing the fluoropolymer elements has similarities to aspects of method 300.

Figure 8:
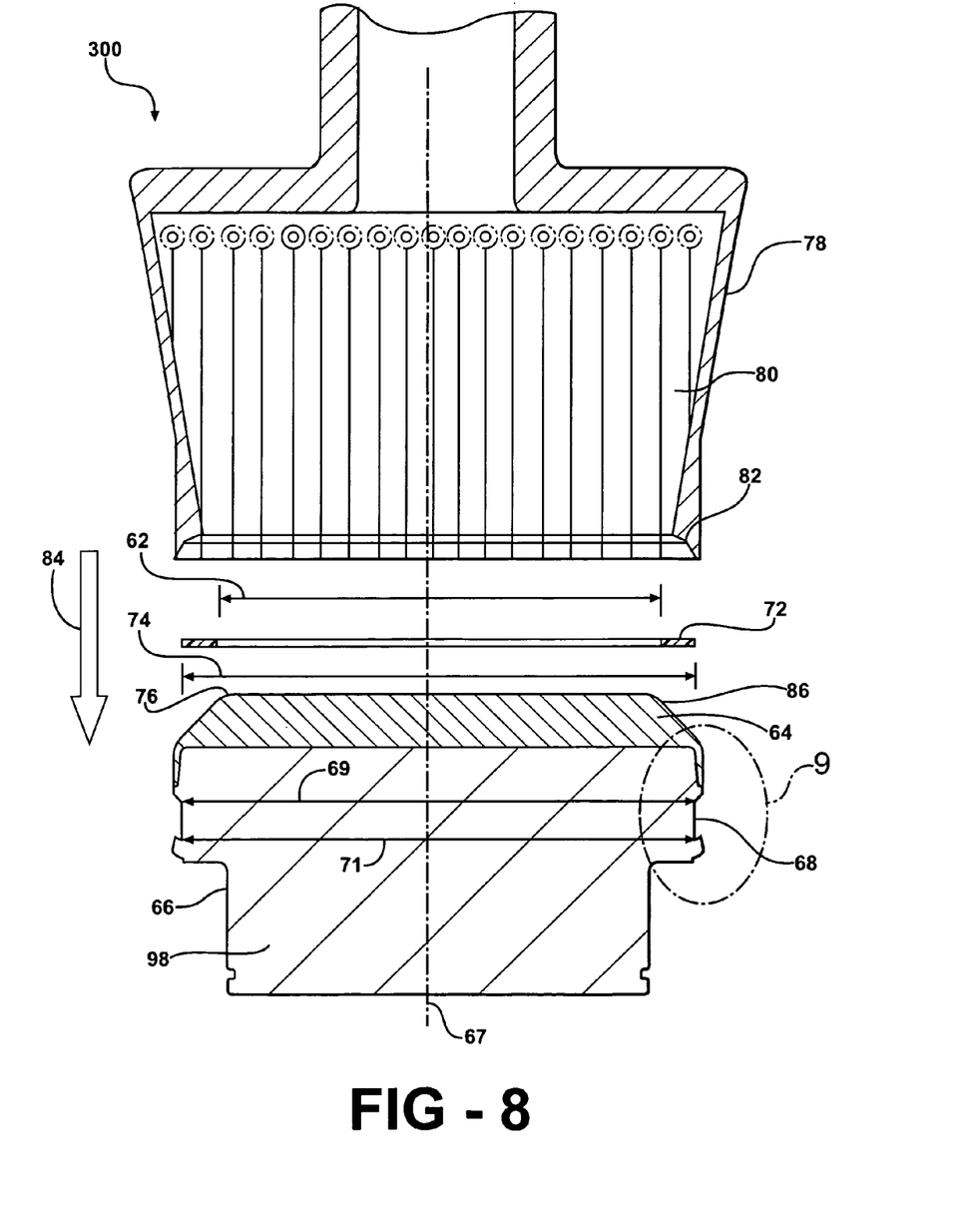
FIG. 8 is a sectional view of a mandrel loaded onto the mold core, used for pre-stressing a fluoropolymer seal prior to bonding the fluoropolymer seal to an elastomeric casing and an installation tool for stretching the fluoropolymer seal over the mandrel and then onto the mold core.
Figure 9A:
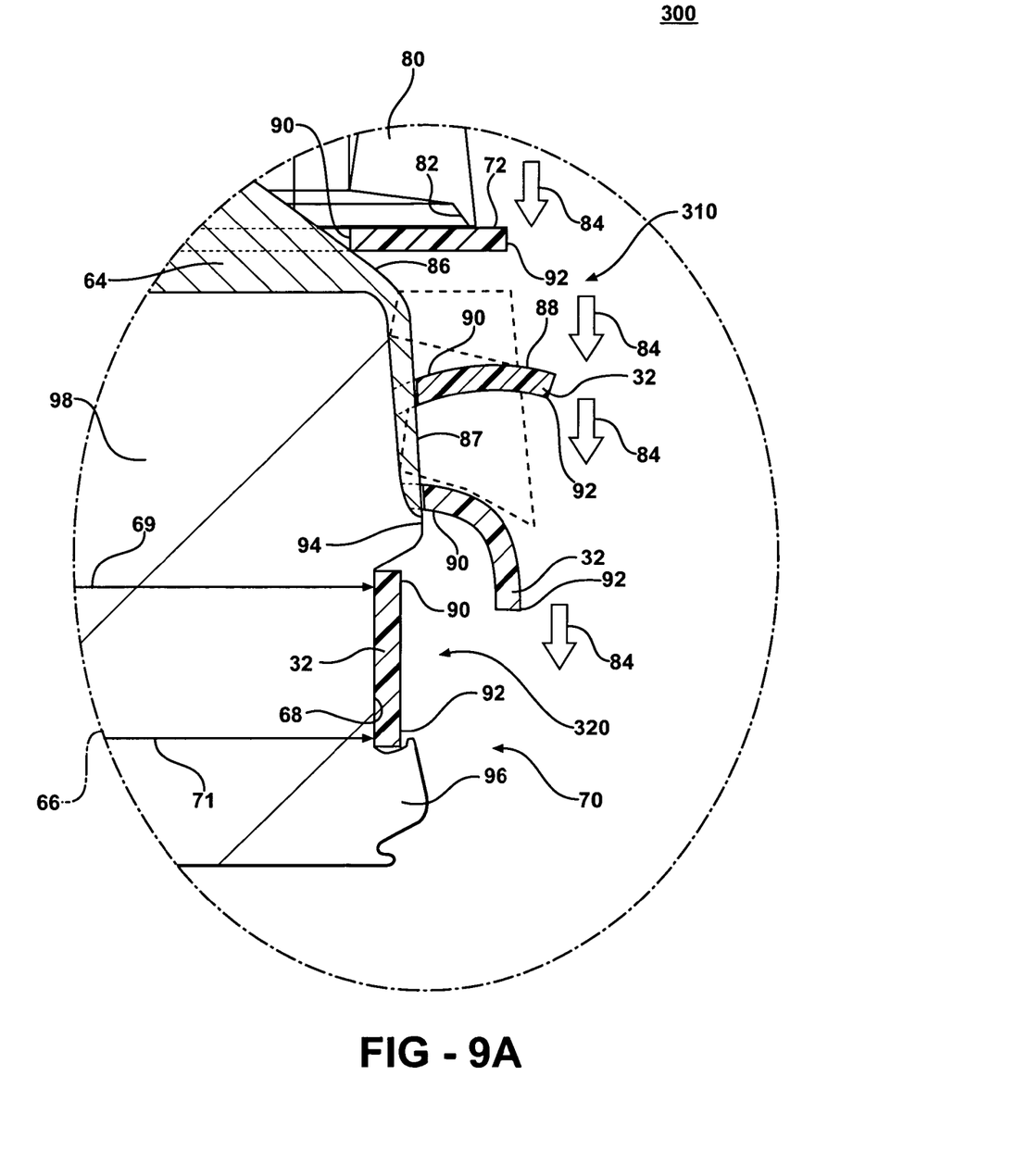
FIG. 9A is an enlarged sectional view of region 9 of the mandrel of FIG. 8 during the stretching of a fluoropolymer seal over the mandrel by operation of the installation tool illustrating a first seal orientation within the mold.
Figure 9B:
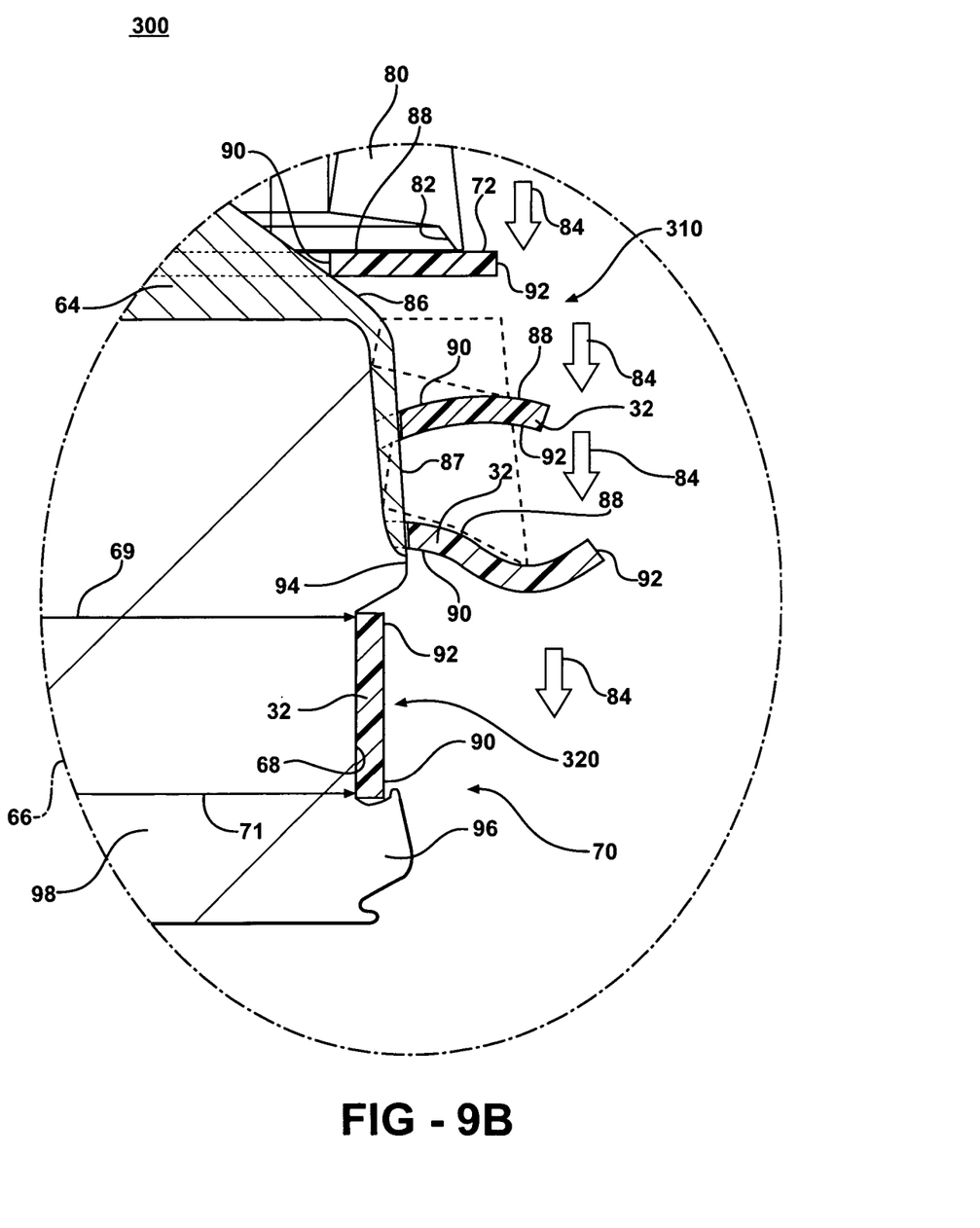
FIG. 9B is an enlarged sectional view of region 9 of the mandrel of FIG. 8 during the stretching of a fluoropolymer seal over the mandrel by operation of the installation tool illustrating a second seal orientation within the mold.
Figure 10:
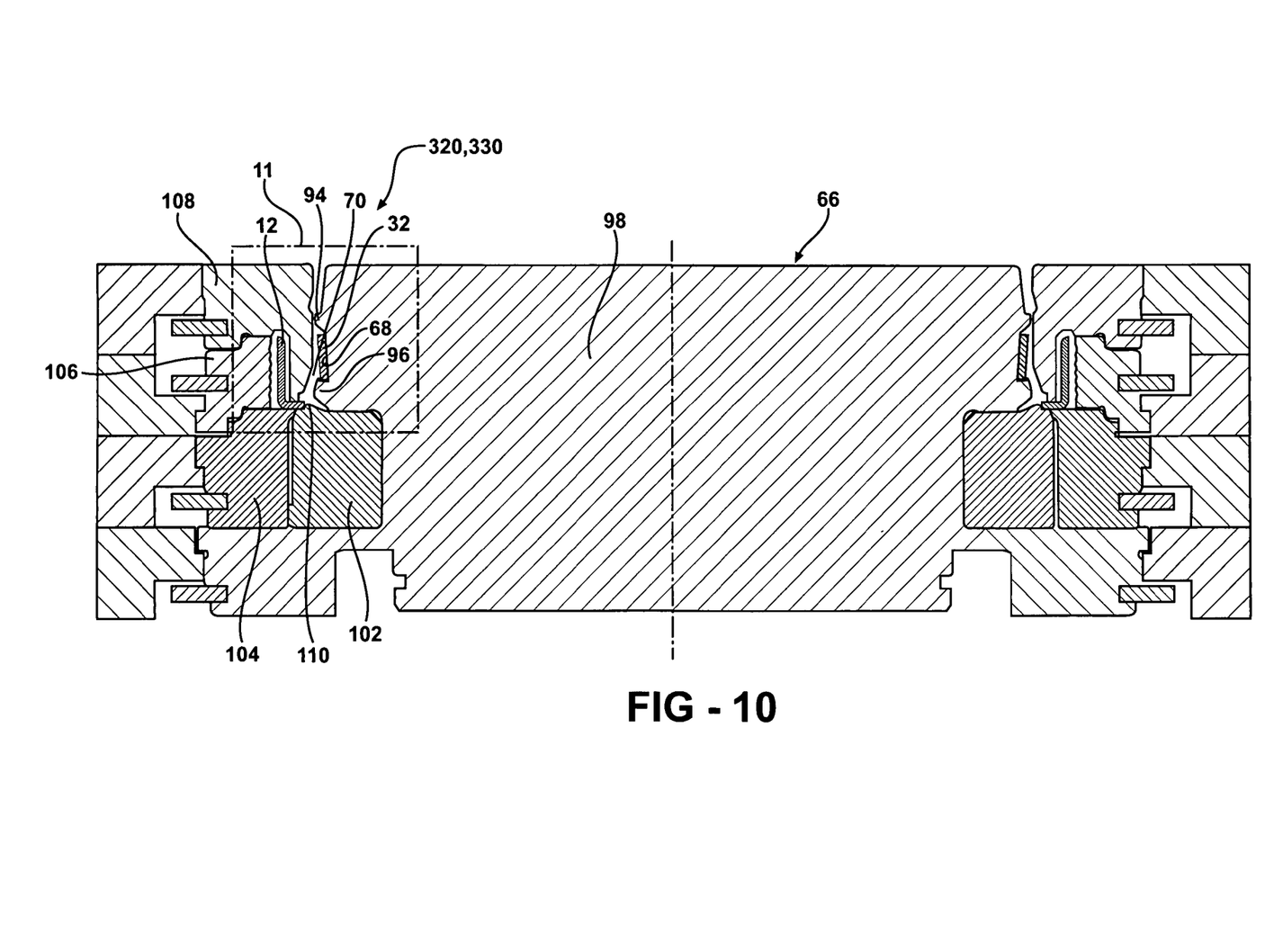
FIG. 10 is a sectional view of a fluoropolymer seal positioned onto the mold core and adjacent to a rigid casing within a mold utilized to form and mold the radial shaft seal of the present invention.
Figure 11:
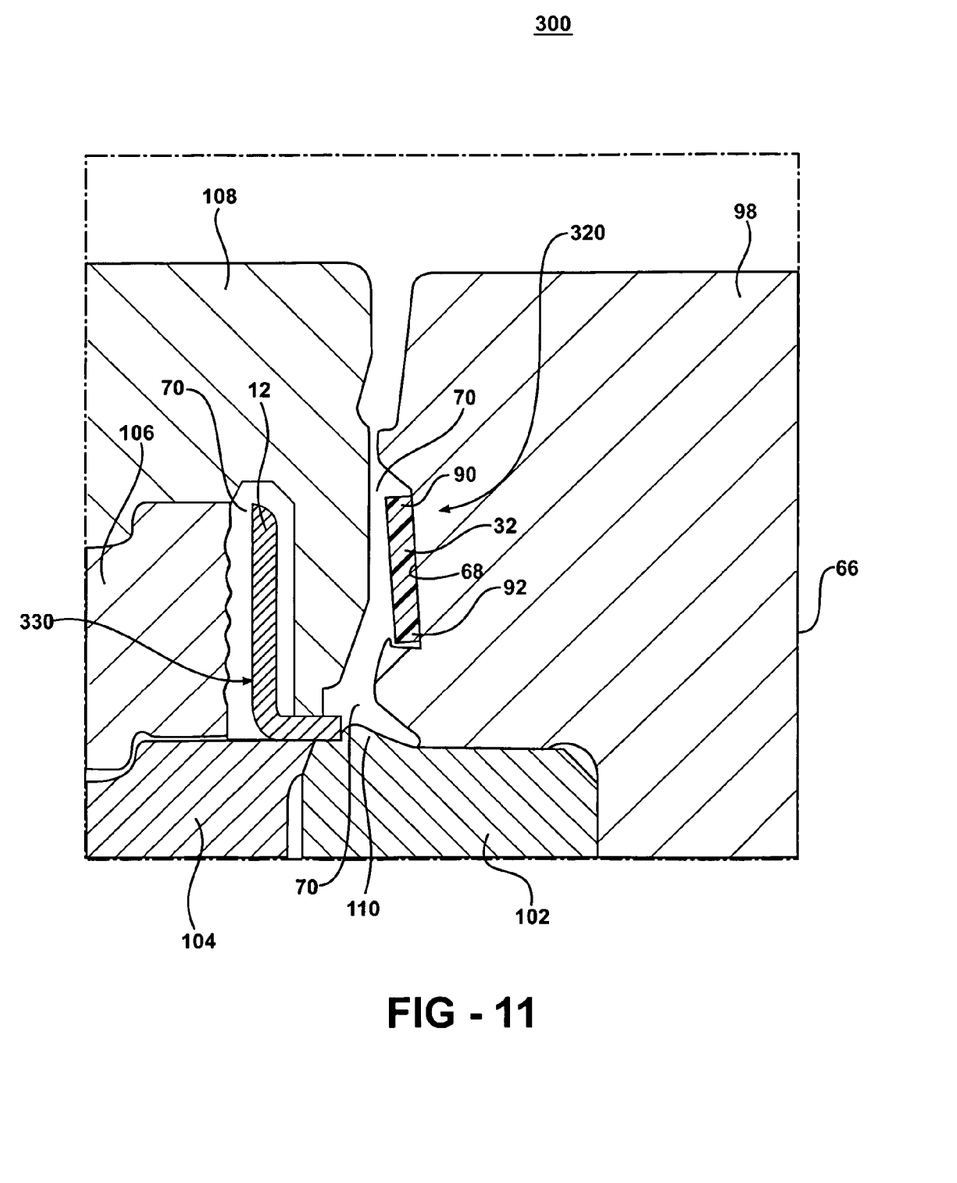
FIG. 11 is an enlarged sectional view of region 11 of FIG. 10 prior to filling the mold with the elastomeric material.

The pre-stressed fluoropolymer seal 32 is initially in an unstressed or unstretched state as a fluoropolymer seal preform 72, such as a flat cylindrical fluoropolymer washer 72. The washer preferably has a thickness in the range of about 0.010 to 0.060 inches. The outer diameter 74 and inner diameter 62 are selected such that half of their difference determines the length of the second or sealing surface 36 of radial seal 10. Second surface 36 may be any suitable length, but typically ranges from about 0.15-0.25 inches. Referring to FIGS. 8, 9A and 9B, the flat fluoropolymer washer 72 is placed onto the upper end 76 of the mandrel. The diameter of the upper end 76 of the mandrel 64 is smaller than the inner diameter 62 of fluoropolymer washer 72. An expandable pusher or installation tool 78 is in the form of a plunger having an expandable lower section, such as a plurality of separate expandable fingers 80. The expandable fingers 80 each have a contact surface 82 which is used to engage the flat washer 72 as the installation tool is moved into contact with the flat washer 72 and mandrel 64 in the direction shown by arrow 84. As shown in FIGS. 9A and 9B, as the fingers 80 of the expandable pusher or installation tool 78 move along the tapered outer surface 86 of mandrel 64, the contact surfaces 82 of the expandable fingers 80 engage the upper surface 88 of fluoropolymer washer 72 causing it to slide down the outer surface 86 of mandrel 64. Mandrel 64 may have one or more tapers and is constructed such that the diameter of the lower surface 87 of mandrel 64 is at least greater than the inner diameter 62 of fluoropolymer washer. The taper is illustrated as having a linear profile, but may also have a convolute or involute profile, or any other suitable tapered profile for pre-stressing the preform 72. The size of the preform 72 together with the size of the mandrel 64 and the associated portions of the mold 66, such as the post surface, determine the amount of stretching that is performed on the fluoropolymer seal preform 72 and the amount of pre-stress imparted to pre-stressed fluoropolymer seal 32. The washer 72 and mandrel 64 may be selected such that the diameter of lower surface 87 of mandrel 64 is greater than the outer diameter of fluoropolymer seal preform 72. Thus, washer 72 is assured to be pre-stressed on both the inner diameter 62 and outer diameter 74. As the washer 72 slides down the outer surface 86 of mandrel 64, it is plastically stretched or deformed thereby causing the washer to become pre-stressed. The level of stress along the length of the pre-stressed fluoropolymer seal 32 varies because the portion of the washer 72 adjacent to the inner diameter 62 of the fluoropolymer washer 72 is stretched to a greater extent than portion adjacent to the outer diameter 74. The inner diameter 62 of washer 72 is stretched, preferably to the conical form shown in FIG. 9A or 9B, preferably by lowering the plunger 78 along the mandrel 64 to expand the inner diameter 62 and pre-stress first end 90 of the fluoropolymer seal 32. The outer diameter 74 is also expanded as it glides downward along the mandrel, thereby pre-stressing second end 92 of fluoropolymer seal 32. In the example shown in FIG. 9A, the amount of internal stress in first end 90 is greater than the amount of internal stress in second end 92, because it experiences more deformation. In the step of stretching 310, the fluoropolymer washer 72 is stretched to form pre-stressed seal 32. Washer 72 is stretched from about 5 to 180 percent of the original size of the inner diameter, and more preferably in the range of about 5 to 120 percent of the original size of the inner diameter to develop the desired amounts of pre-stress in seal 32. The pre-stressed fluoropolymer seal 32 is maintained in the stretched and pre-stressed condition prior to molding with the elastomeric material, and is not generally subjected to any steps to relieve the internal stress, such as various forms of annealing or other methods of providing stress relief.

Method 300 then proceeds with the step of locating 320 the pre-stressed fluoropolymer seal 32 in the mold 66 such that it engages a post surface 68 of the mold 66. In FIG. 9A, the second end 92 of the pre-stressed fluoropolymer seal 32 is passed over first shoulder 94 before the first end 90 and pre-stressed seal 32 ends up in the orientation shown. Alternately, in FIG. 9B, by careful manipulation of the seal as it is being slid over first shoulder 94, such as by preventing the second end 92 from passing over the first shoulder 94 by rolling it upwardly onto the fingers while the first end 90 is pushed over the first shoulder 94, the first end 90 of the now pre-stressed fluoropolymer seal 32 is passed over first shoulder 94 before the second end 92 and pre-stressed fluoropolymer seal 32 ends up in the alternate orientation shown. Mandrel 64 and first shoulder 94 may be configured so as to facilitate the orientation of first end 90 and second end 92. This ability to alter the orientation is particularly advantageous because it allows the pre-stressed seal to be oriented with the higher level of pre-stress in opposite orientations using the same mold, such that it is possible to mold at least two embodiments or configurations of the pre-stressed fluoropolymer seal 32 without altering the mold.

Following the step of locating 320 the pre-stressed fluoropolymer seal, the seal 32 is located in the mold 66 and is engaged against post surface 68, and preferably resting on a second shoulder 96. It should be noted that mandrel 64 may comprise a portion of a center element 98 of mold 66 (not shown), or may comprise a separate (and removable) element, as shown in FIG. 8. The post surface 68 is shown in FIGS. 8, 9A and 9B as having a slightly downwardly expanding taper, such that post surface has a first end diameter 69 and a second end diameter 71, wherein the second end diameter is greater than the first end diameter. Alternately, post surface could have an upwardly expanding taper (not shown), such that first end diameter 69 is located below second end diameter 71, wherein the second end diameter is still greater than the first end diameter. Pre-stressed seal 32 could be located on such a post surface in either of the configurations described above. Where tapered, post surface 68 could have a linear taper as shown in FIGS. 9A and 9B, or it is believed that it could have an involute or convolute taper. Alternately, it is believed that post surface could have a straight profile (not shown) that is approximately parallel to a longitudinal axis 67 of mold 66, or a concave, convex or other curved profile, or other complex profiles, such as a bellows shape or a like complex profile.

Either before or after the stretched fluoropolymer seal is located within the mold, method 300 includes the step of locating 330 the rigid casing 12 within the mold 66. One or more of the mating mold elements (e.g., such as elements 98, 102, 104, 106, 108) will preferably have one or more locating features, such as shoulder 110 to locate rigid casing 12 in the mold 66, particularly while the mold elements 98, 102, 104, 106 and 108 are moved into position to form mold cavity 70.

Figure 12:
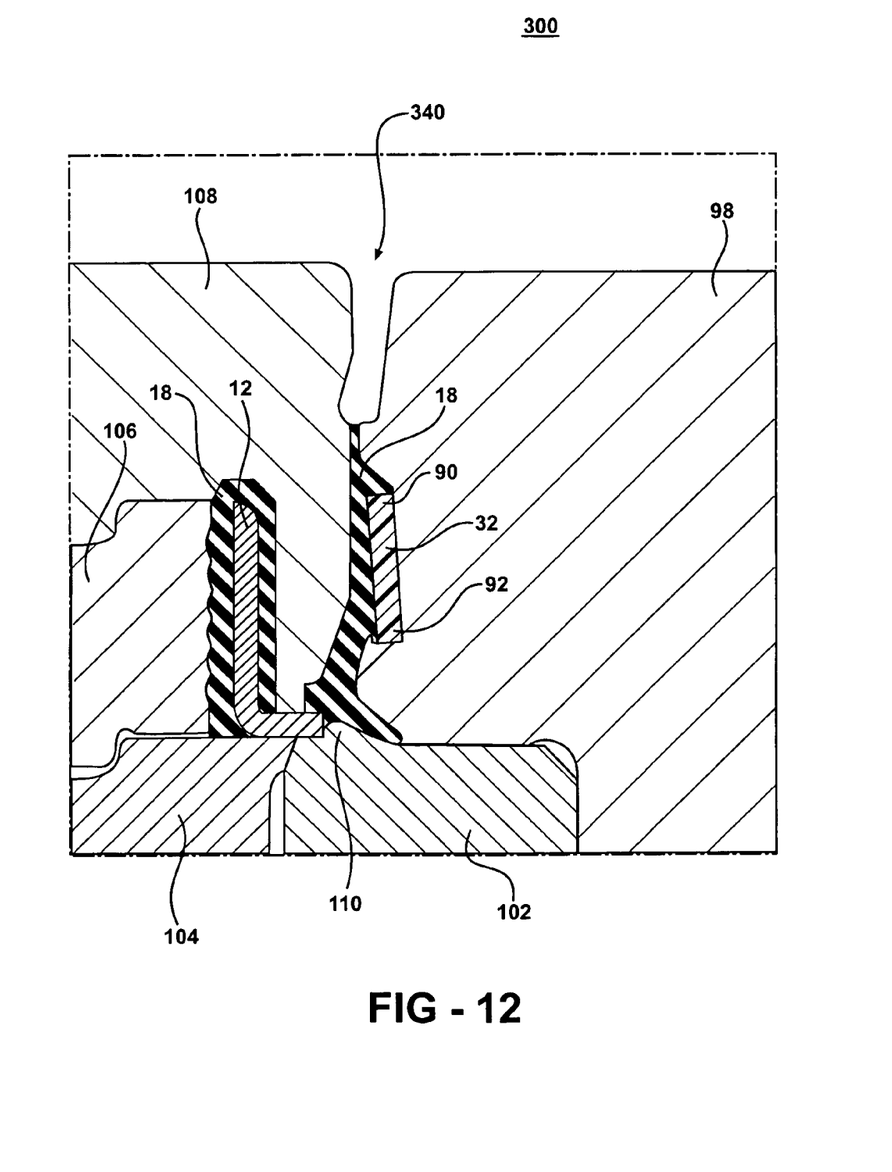
FIG. 12 is an enlarged sectional view of region 11 of the mold of FIG. 10 after filling the mold with the elastomeric material.

After the rigid casing 12 is located within the mold 66, method 300 then proceeds with the step of introducing 340 an elastomeric material into the mold cavity 70 using one of a number of known molding techniques, as shown in FIG. 12. The elastomeric material is selected using known criteria for compatibility with the rigid casing, pre-stressed fluoropolymer seal 32, and the intended application environment of the radial seal 10. A suitable elastomeric material is introduced into the mold cavity 70 and allowed to cure, typically at an elevated temperature and/or pressure, to form elastomeric casing 18 and the integral radial seal 10 of the present invention. A further post cure operation, after molding, is optional.

By maintaining the fluoropolymer seal 32 in its pre-stressed or its stretched condition, significant savings can be made by providing a radial shaft seal that utilizes less fluoropolymer than prior art designs, as well the requirements for a second rigid casing 12 typically used in crimped seal designs.

With reference to FIG. 13, the radial seal 10' of the present invention is depicted in phantom as it might appear in the as-molded condition. Typically following extraction from the mold 66, the radial seal is trimmed to remove mold flashing and form the finished radial seal 10 shape shown as an example in FIG. 13. The trimming may be performed by cutting, shearing or otherwise excising the seal from the flashing using a tool to excise or trim the flashing from the as-molded seal 10'. Alternately, the as-molded seal 10' may be adapted to provide a thinned section (not shown) such as at location 120 which is operative to provide removal of the flashing by tearing or ripping the flashing without the necessity of a cutting or other excising tool.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:
1. A radial seal, comprising:
a rigid casing;
an elastomeric casing positioned interior of and bonded to said rigid casing, said elastomeric casing having an axial spring member which extends radially inwardly from and axially along said rigid casing, said axial spring member comprising a neck portion which extends from said elastomeric casing and a seal attachment portion that is attached to said neck portion and has a bonding surface;
a pre-stressed fluoropolymer seal having an axial length with a bonding surface extending over the entirety of said axial length and an opposite sealing surface, and
a bond extending over and joining the entirety of said bonding surface of the pre-stressed fluoropolymer seal to said bonding surface of said seal attachment portion, wherein said seal attachment portion is operative to pro- vide sealing contact of the fluoropolymer seal along the entirety of said sealing surface when engaged with a mating surface of a shaft.

2. The radial seal of claim 1, wherein said rigid casing comprises a metal.

3. The radial seal of claim 1, wherein said metal comprises steel.

4. The radial seal of claim 1, wherein said rigid casing comprises a rigid plastic or a rigid plastic composite.

5. The radial seal of claim 1, wherein said rigid casing comprises a radial portion and an axial portion.

6. The radial seal of claim 5, wherein said elastomeric casing is bonded to said rigid casing at least along an interior surface of said radial portion.

7. The radial seal of claim 5, wherein said elastomeric casing is bonded to said rigid casing at least along an exterior surface of said radial portion.

8. The radial seal of claim 1, wherein said pre-stressed fluoropolymer seal comprises polytetrafluoroethylene.

9. The radial seal of claim 1, wherein said pre-stressed fluoropolymer seal has a sealing groove formed in said sealing surface.

10. The radial seal of claim 9, wherein said sealing groove is a continuous groove that extends radially about and axially along said sealing surface.

11. The radial seal of claim 10, wherein said sealing groove has a depth which varies axially along said sealing surface.

12. The radial seal of claim 8, wherein said sealing groove is a circumferential groove.

13. The radial seal of claim 1, wherein said pre-stressed fluoropolymer seal comprises a plurality of sealing grooves formed on said sealing surface.

14. The radial seal of claim 1, wherein said neck portion has a substantially curvilinear profile.

15. The radial seal of claim 1, wherein said neck portion has a substantially convoluted profile.

16. The radial seal of claim 1, wherein said neck portion has a substantially axially converging bellows-shaped profile.

17. The radial seal of claim 1, wherein said pre-stressed fluoropolymer seal is pre-stressed by radially stretching a fluoropolymer washer having an inner diameter in the range of about 5-180% of the inner diameter.

18. The radial seal of claim 1, wherein said pre-stressed fluoropolymer seal has an internal stress which varies axially along said sealing surface.

19. The radial seal of claim 1, wherein said seal attachment portion and said pre-stressed fluoropolymer seal are operative to provide an interference fit of said sealing surface on a mating shaft, and wherein said seal attachment portion is operative to provide sealing contact of the fluoropolymer seal along the entirety of said sealing surface when engaged with the mating shaft by application of a radial compressive force on the shaft.

20. The radial seal of claim 1, wherein said pre-stressed fluoropolymer seal has a thickness and said seal attachment portion has a thickness, and said thickness of said seal attachment portion is greater than one half of said thickness of said pre-stressed fluoropolymer seal along the entirety of said axial length of said pre-stressed fluoropolymer seal.

21. The radial seal of claim 1, wherein said pre-stressed fluoropolymer seal has a thickness in the range of about 0.010-0.060 inches.

22. The radial seal of claim 1, wherein said seal attachment portion has a thickness which varies axially over said bonding surface of said pre-stressed fluoropolymer seal, said thickness decreasing in a direction axially away from said neck portion.

23. The radial seal of claim 1, wherein said seal attachment portion has a thickness which varies radially around said bonding surface of said pre-stressed fluoropolymer seal.

24. The radial seal of claim 1, wherein said elastomeric casing further comprises a sealing lip operative to provide static sealing contact with the mating surface of the shaft in response to an axial force applied to said sealing lip.

\* \* \* \* \*